United States Patent Office 3,381,859
Patented May 7, 1968

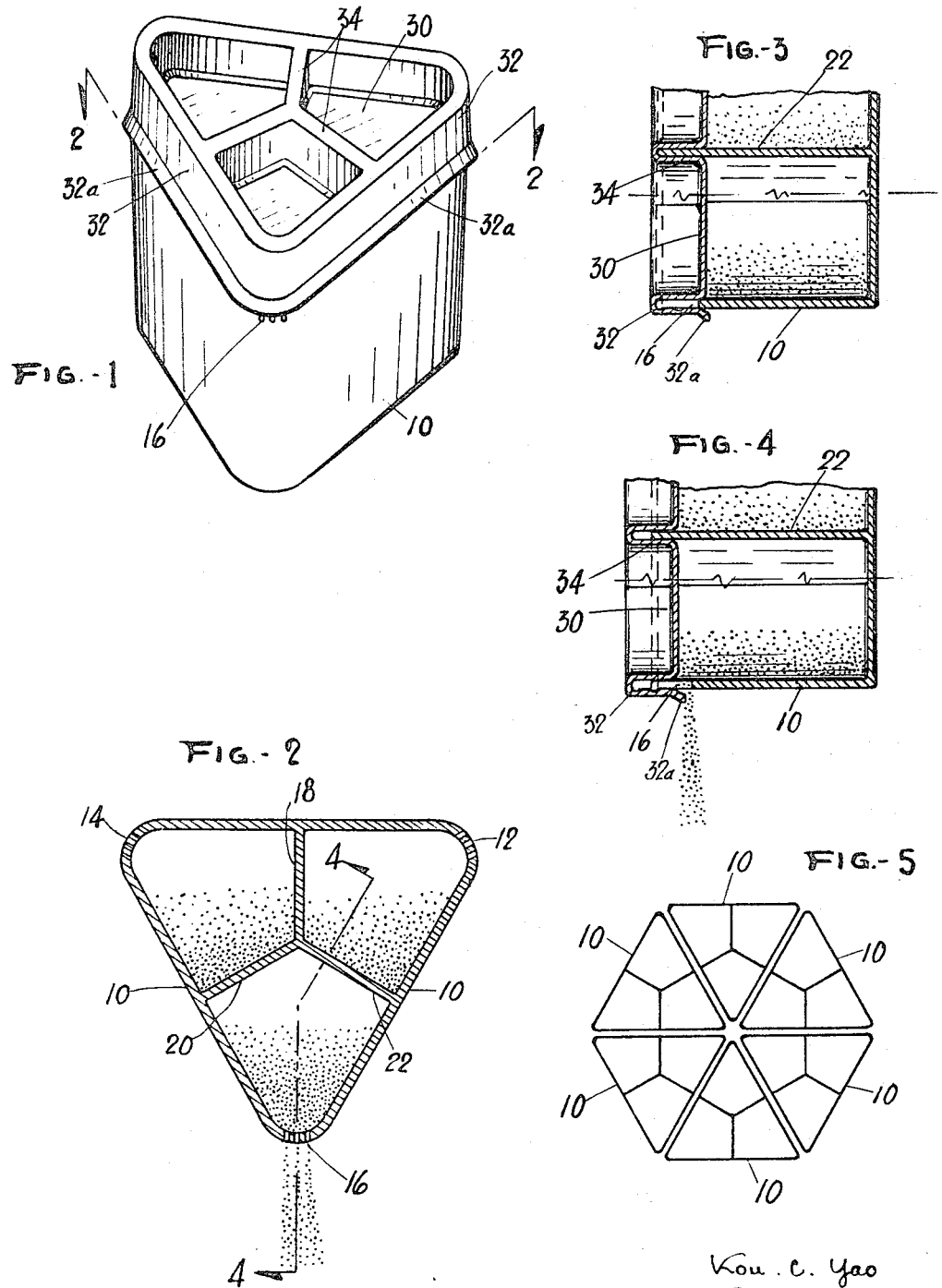

3,381,859
TRIPLE CONDIMENT SHAKER
Kou C. Yao and Anna Yao, both of 11841 Wagner St., Culver City, Calif. 90230
Continuation-in-part of application Ser. No. 563,242, July 6, 1966. This application July 10, 1967, Ser. No. 652,282
4 Claims. (Cl. 222—142.4)

ABSTRACT OF THE DISCLOSURE

A triangular shaped shaker-type holder for granular condiments is described in the following specification, the holder being constructed so that several different condiments may be housed in a single holder and independently dispensed therefrom.

This application is a continuation-in-part of copending application Ser. No. 563,242 filed July 6, 1966.

Background of the invention

Condiment holders are known which have separate compartments for the different condiments, and which are designed so that the condiments may be selectively discharged from the various compartments.

It is an object of the present invention to provide an improved structure for such a multi-compartment condiment holder. To that end, the holder of the present invention is constructed to have a triangular shape to facilitate the independent discharge of the condiments from the separate compartments, and so that clusters of the holders may be conveniently stored in a compact area.

The holder of the invention, as will be described, is constructed to have dispensing openings for the several compartments protected by a slidable cover. The cover is shaped to form an umbrella over the openings when they are open to protect the openings from dust and other foreign materials. Moreover, the cover may be moved to a position wherein its sides completely close the dispensing openings, so as to retain the condiments in their separate compartments when the holder is not in use.

The holder of the present invention is relatively simple to produce. The illustrated embodiment, for example, is composed of but two molded parts, that is, a cover and a container. The container, for example, is shaped as an equilateral triangle and it is equally divided into three separate compartments by internal partitions which are integral with one another and with the side and bottom walls of the container.

Summary of the invention

The condiment holder of the present invention includes a container which has a triangular shape, and which has internal partitions defining three separate compartments in the container. The container has a closed bottom and an open top. A triangular-shaped cover fits over the open top in a vertical sliding press fit. The cover has a groove extending around its periphery which receives the upper rims of the side walls of the holder.

The cover also has a side wall which extends down over the dispensing openings in the upper rim of the container when the cover is in a "down position" on the upper end of the container, but which uncovers the openings when the cover is moved to an "up" position. The cover side wall is shaped to form an "umbrella" over the openings when the cover is in its "up" position to protect the openings from dust, or other foreign materials.

The side walls of the container each meet at a corresponding apex, and each apex is rounded off, with the respective dispensing openings being located at the apexes adjacent the upper rims thereof. This permits the dispensing of the condiment from each compartment, merely by tilting the holder towards the apex corresponding to that compartment so that the condiment may be discharged through the discharge openings in that particular apex.

Brief description of the drawings

FIGURE 1 is a perspective view of one embodiment of the invention, showing the configuration of the container and of the cover, and showing the cover in its "up" position so as to expose the discharge openings;

FIGURE 2 is a cross section of the container, taken essentially along the lines 2—2 of FIGURE 1;

FIGURES 3 and 4 are side sections of the container, taken essentially along the lines 4—4 of FIGURE 2, and respectively showing the cover in its "down" position and in its "up" position; and FIGURE 5 is a plan view of a plurality of containers, such as the container of FIGURE 1, showing the containers, on a reduced scale, conveniently stored in a compact area.

Description of the illustrated embodiment

The holder illustrated in the drawing includes a container 10 which is shaped as an equilateral triangle, as shown. The container 10 has an open top, and has integral side and bottom walls. The angles of the container are rounded off, as shown, and dispensing openings 12, 14 and 16 are provided adjacent the upper rim at each apex of the triangle.

An integral partition, such as the partitions 18, 20 and 22, projects from the longitudinal center of each side wall of the container 10 and perpendicular to each side wall; the partitions meeting at a common axis in the center of the container which is perpendicular to the bottom wall. As best shown in FIGURE 2, the partitions 18, 20 and 22 separate the container into three independent compartments, each having its own set of dispensing openings 12, 14 and 16.

The holder includes a removable triangular cover 30 which, as shown, has side walls 32 and interior walls 34 which overlie the rims of the side walls of the container and the rims of the partitions respectively. The edges of the side walls and interior walls of the cover are provided with grooves which accommodate the rims of the container side walls and of the partitions, as shown, for example, in FIGURES 3 and 4.

As best shown in FIGURES 3 and 4, the cover may be moved to a "down" position (FIGURE 3) in which the side wall 32 of the cover completely encloses the dispensing openings 12, 14 and 16. In such a position, the holder may be packed, or otherwise transported, without spilling the condiments out of its compartments.

When the holder is to be used, the cover 30 may be moved to its "up" position (FIGURE 4) in which the dispensing openings are uncovered, permitting the condiments to be dispensed. When the cover is in the position of FIGURE 4, it will be appreciated that the condiments from any of the compartments may be dispensed, independently of the other compartments, merely by tilting the holder towards the apex corresponding to the desired compartment. Suitable indicia may be included on the outer surfaces of the container side walls, indicating the condiments contained in the respective compartments.

The side walls 32 of the cover are provided with a flange 32a at the lower end thereof. The flange 32a extends outwardly and downwardly, and it forms an "umbrella" over the dispensing openings of the container when the cover is in its "up" position. This flange serves as a protection of the openings, in that it prevents dust or other foreign matter from gathering around the openings.

As shown in FIGURE 5, a plurality of the dispensers 10 may be conveniently stored adjacent one another in a compact space, and the holders of the invention are shaped so that they may also be stacked on top of one another.

While a particular embodiment of the invention has been shown and described, modifications may be made. It is intended in the claims to cover all modifications which come within the spirit and scope of the invention.

What is claimed is:

1. A triangular shaped holder for confining condiments, such as salt and pepper, in separate compartments thereof, for selective discharge therefrom, said holder comprising:

an open topped triangular container having side and bottom walls, the apexes of the container being provided with respective groups of dispensing openings positioned adjacent the upper rim of the container;

interior partitions positioned in the container and forming separate compartments around respective groups of said dispensing openings;

a removable triangular cover having a top wall, side walls and interior walls, the edges of said cover side walls being provided with grooves which receive the upper rims of said container side walls when said cover is placed on said container, said cover being vertically slidable on the container from an upper position in which the dispensing openings are open and a lower position in which said cover side walls close said dispensing openings.

2. The holder defined in claim 1 wherein each of said partitions comprises an integral partition projecting from the longitudinal center of each side wall and perpendicular to each side wall, the integral partitions meeting at a common axis in the container perpendicular to said bottom wall and forming three equal compartments in the container.

3. The holder defined in claim 1 in which the lower edges of said cover side walls are provided with an outwardly and downwardly extending flange adapted to form an umbrella for the dispensing openings of said container when said cover is in its upper position.

4. The holder defined in claim 1 in which the apexes of the container and of the cover are rounded off.

References Cited
UNITED STATES PATENTS

| | | | |
|---|---|---|---|
| 553,580 | 1/1896 | Frye | 222—142.1 |
| 1,215,018 | 2/1917 | Grossman | 222—142.6 |
| 2,566,004 | 8/1951 | Von Duyke | 222—142.4 |
| 2,679,952 | 6/1954 | Carpenter | 222—142.4 |
| 3,120,909 | 2/1964 | Miller | 222—522 |
| 3,323,683 | 6/1967 | Cianciolo | 222—142.6 |

ROBERT B. REEVES, *Primary Examiner.*

F. R. HANDREN, *Assistant Examiner.*